US011603313B2

(12) United States Patent
Luna et al.

(10) Patent No.: US 11,603,313 B2
(45) Date of Patent: Mar. 14, 2023

(54) METHOD FOR PRETREATING AND RECOVERING A RARE GAS FROM A GAS CONTAMINANT STREAM EXITING AN ETCH CHAMBER

(71) Applicants: Jennifer Bugayong Luna, Lancaster, NY (US); Atul M. Athalye, San Marcos, CA (US); Ce Ma, Apex, NC (US); Ashwini K. Sinha, East Amherst, NY (US)

(72) Inventors: Jennifer Bugayong Luna, Lancaster, NY (US); Atul M. Athalye, San Marcos, CA (US); Ce Ma, Apex, NC (US); Ashwini K. Sinha, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 17/552,869

(22) Filed: Dec. 16, 2021

(65) Prior Publication Data
US 2022/0363540 A1 Nov. 17, 2022

Related U.S. Application Data

(60) Provisional application No. 63/187,061, filed on May 11, 2021.

(51) Int. Cl.
*B01D 53/00* (2006.01)
*B01D 53/04* (2006.01)
(Continued)

(52) U.S. Cl.
CPC ........ *C01B 23/0094* (2013.01); *B01D 53/005* (2013.01); *B01D 53/0462* (2013.01);
(Continued)

(58) Field of Classification Search
CPC .............. C01B 23/0094; C01B 3/0089; C01B 23/0078; C01B 23/0057; C01B 23/0021;
(Continued)

(56) References Cited

U.S. PATENT DOCUMENTS

| 5,417,742 A * | 5/1995 | Tamhankar | .......... B01D 53/047 95/902 |
| 7,794,523 B2 * | 9/2010 | Whitlock | ............... B01D 53/75 95/149 |

(Continued)

FOREIGN PATENT DOCUMENTS

| JP | 2006326553 A | 12/2006 |
| JP | 2019195758 A | 11/2019 |

(Continued)

*Primary Examiner* — Timothy C Vanoy

(57) ABSTRACT

Novel methods for pretreating a rare-gas-containing stream exiting an etch chamber followed by recovering the rare gas from the pre-treated, rare-gas containing stream are disclosed. More particularly, the invention relates to the pretreatment and recovery of a rare gas, such as xenon or krypton, from a nitrogen-based exhaust stream with specific gaseous impurities generated during an etch process that is performed as part of a semiconductor fabrication process.

37 Claims, 2 Drawing Sheets

Example process flow diagram for xenon recovery system.

(51) Int. Cl.
  *B01D 53/14* (2006.01)
  *C01B 23/00* (2006.01)
(52) U.S. Cl.
  CPC ..... *B01D 53/1431* (2013.01); *B01D 53/1456* (2013.01); *C01B 23/0021* (2013.01); *C01B 23/0057* (2013.01); *C01B 23/0078* (2013.01); *C01B 23/0089* (2013.01); *B01D 2253/1122* (2013.01); *B01D 2257/11* (2013.01); *B01D 2257/2047* (2013.01); *B01D 2257/2066* (2013.01); *B01D 2257/502* (2013.01); *B01D 2257/504* (2013.01); *B01D 2257/80* (2013.01); *C01B 2210/0004* (2013.01); *C01B 2210/005* (2013.01); *C01B 2210/0021* (2013.01); *C01B 2210/0025* (2013.01); *C01B 2210/0035* (2013.01); *C01B 2210/0037* (2013.01); *C01B 2210/0056* (2013.01); *C01B 2210/0068* (2013.01); *C01B 2210/0098* (2013.01)
(58) Field of Classification Search
  CPC .... C01B 2210/0037; C01B 2210/0035; C01B 2210/0004; C01B 2210/0025; C01B 2210/0021; C01B 2210/0068; C01B 2210/005; C01B 2210/0056; C01B 2210/0098; B01D 53/005; B01D 53/1456; B01D 53/1431; B01D 53/0462; B01D 2257/11; B01D 2253/1122; B01D 2257/502; B01D 2257/504; B01D 2257/80; B01D 2257/2066; B01D 2257/2047

See application file for complete search history.

(56) References Cited

U.S. PATENT DOCUMENTS

| 10,295,255 | B2 | 5/2019 | Barrett et al. |
| 2005/0235828 | A1 | 10/2005 | Ishihara |
| 2006/0107831 | A1* | 5/2006 | Karwacki, Jr. ........ B01D 53/04 95/116 |
| 2017/0120184 | A1 | 5/2017 | Friedrich et al. |

FOREIGN PATENT DOCUMENTS

| WO | 2007/091100 A1 | 8/2007 | |
| WO | WO 2008/065633 A1 * | 6/2008 | ............. C01B 23/00 |

* cited by examiner

Xenon Recovery Integrated System: Major Unit Operations

Example process flow diagram for xenon recovery system.

METHOD FOR PRETREATING AND RECOVERING A RARE GAS FROM A GAS CONTAMINANT STREAM EXITING AN ETCH CHAMBER

RELATED APPLICATIONS

This application claims the benefit of U.S. Provisional Application Ser. No. 63/187,061, filed on May 11, 2021, which is incorporated herein by reference.

FIELD OF THE INVENTION

This invention relates to novel methods for pretreating a rare-gas-containing stream exiting an etch chamber followed by recovering the rare gas from the pre-treated, rare-gas containing stream. More particularly, the invention relates to the pretreatment and recovery of a rare gas, such as xenon or krypton, from a nitrogen-based exhaust stream with specific gaseous impurities generated during an etch process that is performed as part of a semiconductor fabrication process.

BACKGROUND OF THE INVENTION

Xenon is a noble-gas element that is stable due to its closed-shell electronic structure. The favorable physical properties of xenon include its ionization potential, atomic mass and electronic structure that make it suitable for a growing number of applications. Demand for xenon is growing in core applications and emerging applications. Of particular significance is xenon's usage in semiconductor etchant processes. Xenon has been increasingly used in dry etching processes, specifically for making semiconductor devices for memory chips such as 3D NAND, DRAM and logic chips. Adding xenon to fluorocarbon (e.g., $C_4F_6$) plasmas that are used to etch silicon oxide during semiconductor manufacturing improves the anisotropy of the etch profile. Xenon also improves etch selectivity, such that the etch rate of silicon oxide is much higher than the photoresist used to pattern the silicon oxide film.

Xenon is a relatively high cost material. Xenon is a trace component of the atmosphere (87 ppb), whereby 11 million L of air is needed to obtain 1 L of xenon by air separation. Additionally, xenon pricing is quite variable since its supply is controlled by air separation units (ASUs).

Given the high cost and scarcity of supply, etchant processes seek to reuse xenon. However, while reusage of xenon for such etchant processes is recognized as desirable, the existing processes cannot effectively achieve recovery and reuse of xenon for various reasons. For example, the xenon-containing exhaust streams are complex exhaust effluent mixes that contain many difficult-to-handle contaminants. Furthermore, the concentration of xenon in the xenon-containing exhaust is typically relatively low, on the order of less than 0.5 vol %, thereby making its recovery technically challenging and potentially capital intensive. The consequence of these design challenges has left many fab users no option other than to vent the xenon, after only a single use through their respective etch processes.

As a high-value product, and with expected xenon shortages, there is an unmet and growing need to recover xenon from contaminant-laden gaseous streams for reuse as part of an etchant in semiconductor processes.

SUMMARY OF THE INVENTION

In a first aspect of the present invention, a method for pretreating a rare-gas-containing, nitrogen-based exhaust stream exiting an etch chamber, prior to recovery of the rare gas from the rare-gas-containing, nitrogen-based exhaust stream, said method comprising the steps of: receiving the rare-gas-containing, nitrogen-based exhaust stream from the etch chamber, said rare-gas-containing, nitrogen-based exhaust stream having a composition of gas species comprising (a) said rare gas, (b) gaseous impurities and (c) nitrogen (N2), said rare gas in an amount greater than 0 mol % and up to about 0.5 mol %, said gaseous impurities comprising (i) hydrofluorocarbons represented by the general formula CxHyFz, where each of x, y and z are integers that range from 1 to 5, with the proviso that when x=1, y+z=4, and when x=2 to 5, y+z−2x=−2, 0 or 2; (ii) perfluorocarbons represented by the general formula CxFy where x can have any integer values from 2 to 5, where y−2x=−2, 0, or 2; (iii) carbon monoxide (CO); (iv) hydrogen fluoride (HF); (v) silicon fluoride (SiF4); and (vi) carbon tetrafluoride (CF4), wherein each of said gaseous impurities of said CxHyFz, CxFy, CO, SiF4 and CF4 is in an amount greater than 0 mol % and up to about 1 mol % and HF is in an amount greater than 0 mol % and up to about 2 mol %; pretreating the rare-gas-containing, nitrogen-based exhaust stream by introducing the rare-gas-containing, nitrogen-based exhaust stream into a pretreatment system, said pretreatment system comprising a burner, a scrubber and an adsorber to (x) combust a substantial portion of the CO, CxHyFz and the CxFy into combustion products comprising carbon dioxide (CO2) and water vapor (H2O) to create a diluted, rare-gas-containing, nitrogen-based exhaust stream; (y) remove substantially all of the HF and the SiF4 in the scrubber; and (z) adsorb substantially all of the CO2 and the H2O onto an adsorbent to create a pretreated, diluted, rare-gas-containing, nitrogen-based exhaust stream; and withdrawing the pretreated, diluted, rare-gas-containing, nitrogen-based exhaust stream from an outlet of the adsorber of the pretreatment system, said pretreated, diluted, rare-gas-containing, nitrogen-based exhaust stream having a composition comprising the rare gas, the gaseous impurities and the N2, said rare gas in an amount greater than 0 mol % and less than about 0.05 mol %, and said gaseous impurities remaining after the step of pretreating comprising oxygen (O2) in an amount greater than 0.01 mol % and up to about 2 mol %, CF4 in an amount greater than 0 mol % and up to about 0.01 mol %, CO2 in an amount ranging from 0.00001 mol % and up to about 0.0005 mol %.

In a second aspect of the present invention, a method for pretreating and recovering xenon from a nitrogen-based exhaust stream exiting an etch chamber, comprising the steps of: receiving a xenon-containing, nitrogen-based exhaust stream from an etch chamber, said xenon-containing, nitrogen-based exhaust stream having a composition of gas species comprising the xenon, gaseous impurities and nitrogen, said xenon in an amount greater than 0 mol % and up to about 0.5 mol %, and said gaseous impurities comprising hydrofluorocarbons, perfluorocarbons, carbon monoxide (CO), hydrogen fluoride, silicon fluorides and carbon tetrafluoride; wherein each of said gaseous impurities of said hydrofluorocarbons, perfluorocarbons, carbon monoxide, silicon fluorides and carbon tetrafluoride is in an amount greater than 0 mol % and up to about 1 mol %, and further wherein said hydrogen fluoride is in an amount greater than 0 mol % and up to about 2 mol %; pretreating the xenon-containing, nitrogen-based exhaust stream by introducing the same into a pretreatment system, said pretreatment system comprising a burner, a scrubber and an adsorber to (x) combust a substantial portion of the hydrofluorocarbons and the perfluorocarbons and the carbon monoxide into combustion products comprising carbon dioxide and water vapor to create a diluted, xenon-containing, nitrogen-based exhaust stream, (y) remove substantially all of the hydrogen fluoride and the silicon fluorides in the scrubber, and (z) adsorb substantially all of the carbon dioxide and the water vapor onto an adsorbent of the adsorber to create a pretreated, diluted xenon-containing, nitrogen-based exhaust stream; withdrawing the pretreated, diluted, xenon-containing, nitrogen-based exhaust stream from an outlet of the adsorber, said pretreated, diluted, xenon-containing, nitrogen-based exhaust stream having a composition comprising said xenon, said gaseous impurities and said nitrogen, wherein said xenon is in an amount greater than 0 mol % and less than about 0.05 mol %, and said gaseous impurities remaining after the pretreatment comprises oxygen in an amount greater than 0.01 mol % and up to about 2 mol %, carbon tetrafluoride in an amount greater than 0 mol % and up to about 0.01 mol %, carbon dioxide in an amount ranging from 0.00001 mol % up to about 0.0005 mol %; cooling the pretreated, diluted xenon-containing, nitrogen-based exhaust stream to a first non-cryogenic temperature; followed by introducing the pretreated, diluted, xenon-containing, nitrogen-based exhaust stream into a temperature swing adsorber (TSA) containing an adsorbent bed therein, wherein said adsorbent bed contains an AgX adsorbent; and adsorbing the xenon onto the AgX adsorbent preferentially over the gaseous impurities in the pretreated, diluted, xenon-containing, nitrogen-based exhaust stream that are remaining after the step of pretreating.

In a third aspect, a method for pretreating and recovering a rare gas from a nitrogen-based exhaust stream exiting an etch chamber and recovering the rare gas from the nitrogen-based exhaust stream exiting the etch chamber, comprising the steps of: receiving a rare-gas-containing, nitrogen-based exhaust stream from an etch chamber, said rare-gas-containing, nitrogen-based exhaust stream having a composition of gas species comprising the rare gas, gaseous impurities and nitrogen, said rare gas in an amount greater than 0 mol % and up to about 0.5 mol %, said gaseous impurities comprising (i) hydrofluorocarbons represented by the general formula $C_xH_yF_z$, where each of x, y and z can have any integers that range from 1 to 5, with the proviso that when $x=1$, $y+z=4$, and when $x=2$ to 5, $y+z-2x=-2$, 0 or 2, (ii) perfluorocarbons represented by the general formula $C_xF_y$ where x can have any integer values from 2 to 5, where $y-2x=-2, 0,$ or 2, (iii) carbon monoxide (CO), (iv) hydrogen fluoride (HF), (v) silicon fluoride (SiF4) and (vi) carbon tetrafluoride (CF4), wherein each of said gaseous impurities of said $C_xH_yF_z$, $C_xF_y$, CO, SiF4 and CF4 is in an amount greater than 0 mol % and up to about 1 mol %, and HF is in an amount greater than 0 mol % and up to about 2 mol %; pretreating the rare-gas-containing, nitrogen-based exhaust stream by introducing the rare-gas-containing, nitrogen-based exhaust stream into a pretreatment system, said pretreatment system comprising a burner, a scrubber and an adsorber to (x) combust a substantial portion of the $C_xH_yF_z$ and the $C_xF_y$ into combustion products comprising carbon dioxide (CO2) and water vapor (H2O) to create a diluted, rare-gas-containing, nitrogen-based exhaust stream, (y) remove substantially all of the HF and the SiF4 in the scrubber, and (z) adsorb substantially all of the CO2 and the H2O onto an adsorbent of the adsorber to create a pretreated, diluted, rare-gas-containing, nitrogen-based exhaust stream; withdrawing the pretreated, diluted, rare-gas-containing, nitrogen-based exhaust stream from an outlet of the adsorber, said pretreated, diluted, rare gas containing, nitrogen-based exhaust stream having a composition comprising the rare gas, the gaseous impurities and the nitrogen, said rare gas in an amount greater than 0 mol % and less than about 0.05 mol % xenon, and said gaseous impurities remaining after the pretreatment comprising oxygen (O2) in an amount greater than 0.01 mol % and up to about 2 mol %, CF4 in an amount greater than 0 mol % and up to about 0.01 mol % and CO2 in an amount ranging from 0.00001 mol % up to about 0.0005 mol %; cooling the pretreated, diluted, rare-gas-containing, nitrogen-based exhaust stream to a first noncryogenic temperature; followed by introducing the pretreated, diluted, rare-gas-containing, nitrogen-based exhaust stream into a rare gas recovery unit; and recovering the rare gas from the diluted, rare-gas-containing, nitrogen-based exhaust stream.

In a fourth aspect, a pretreatment system for pretreating a rare-gas-containing, nitrogen-based exhaust stream exiting an etch chamber, prior to recovery of the rare gas from the rare-gas-containing, nitrogen-based exhaust stream, said pretreatment system comprising: a collection manifold having an inlet operably connected to upstream etch chambers and an outlet operably connected to a pretreatment system, said collection manifold configured to receive a signal from each of the upstream etch chambers, said signal indicative of the presence or non-presence of the rare gas in an exhaust stream generated from one of the corresponding upstream etch chambers, said collection manifold in response to said signal configured to receive the rare-gas containing, nitrogen-based exhaust stream, and said collection manifold in response to said signal configured to exclude receiving a non-rare-gas, nitrogen-based exhaust stream devoid of the rare gas; and the pretreatment system comprising a burner, a scrubber and a adsorber, said pretreatment system configured to (i) combust a substantial portion of carbon monoxide, hydrofluorocarbon and perfluorocarbon impurities into carbon dioxide and water vapor, (ii) remove a substantial portion of hydrogen fluoride and silicon tetrafluoride impurities in the scrubber, and (iii) adsorb substantially all of the carbon dioxide and the water vapor onto an adsorbent of the adsorber so as to create a pretreated, diluted, rare-gas containing, nitrogen-based exhaust stream.

In a fifth aspect, a system for pretreating and recovering xenon from a xenon-containing, nitrogen-based exhaust stream exiting an etch chamber, comprising: a collection manifold having an inlet operably connected to upstream etch chambers and an outlet operably connected to a pretreatment system, said collection manifold configured to receive a signal from each of the upstream etch chambers, said signal indicative of the presence or non-presence of xenon in an exhaust stream generated from one of the corresponding upstream etch chambers, said collection manifold in response to said signal configured to receive a xenon-containing, nitrogen-based exhaust stream, and said collection manifold in response to said signal configured to exclude receiving a non-xenon-containing, nitrogen-based exhaust stream; the pretreatment system comprising a burner, a scrubber and a adsorber, said pretreatment system configured to (i) combust a substantial portion of first impurities comprising carbon monoxide, hydrofluorocarbon and perfluorocarbon into carbon dioxide and water vapor, (ii) remove a substantial portion of second impurities comprising hydrogen fluoride and silicon tetrafluoride in the scrubber, and (iii) adsorb a substantial portion of third impurities comprising the carbon dioxide and the water vapor onto an adsorbent of the adsorber to create a pretreated, diluted xenon-containing, nitrogen-based exhaust stream; and a temperature swing adsorber (TSA) containing an adsorbent bed therein, wherein said adsorbent bed contains an AgX adsorbent, said TSA having an inlet that is operably connected to an outlet of the adsorber, said TSA configured to receive the pretreated, diluted, xenon-containing, nitrogen-based exhaust stream from the outlet of the adsorber for preferential recovery over the first, the second and third impurities of substantially all of the xenon in the xenon-containing, nitrogen-based exhaust stream.

In a sixth aspect, a system for pretreating and recovering a rare gas from a rare-gas-containing, nitrogen-based exhaust stream exiting an etch chamber, comprising: a collection manifold having an inlet operably connected to upstream etch chambers and said collection manifold having an outlet that is operably connected to a pretreatment system, said collection manifold configured to receive a signal from each of the upstream etch chambers, said signal indicative of the presence or non-presence of the rare gas in an exhaust stream generated from one of the corresponding upstream etch chambers, said collection manifold in response to said signal configured to receive a rare-gas-containing, nitrogen-based exhaust stream, and said collection manifold in response to said signal is configured to exclude receiving a non-rare-gas-containing, nitrogen-based exhaust stream; the pretreatment system comprising a burner, a scrubber and a adsorber, said pretreatment system configured to (i) combust a substantial portion of first impurities comprising carbon monoxide, hydrofluorocarbon and perfluorocarbon impurities into carbon dioxide and water vapor, (ii) remove a substantial portion of second impurities comprising hydrogen fluoride and silicon tetrafluoride in the scrubber, and (iii) adsorb a substantial portion of third impurities of the carbon dioxide and the water vapor onto an adsorbent of the adsorber to create a pretreated, diluted, rare-gas-containing, nitrogen-based exhaust stream; and a rare gas recovery unit configured to receive the pretreated, diluted, rare gas, nitrogen-based exhaust stream from the outlet of the adsorber for preferential recovery over the first, the second and the third impurities of substantially all of the rare gas from the rare-gas-containing, nitrogen-based exhaust stream.

In a seventh aspect, a method for pretreating a rare-gas-containing, nitrogen-based exhaust stream exiting an etch chamber, prior to recovery of the rare gas from the rare-gas-containing, nitrogen-based exhaust stream, said method comprising the steps of: receiving the rare-gas-containing, nitrogen-based exhaust stream from the etch chamber, said rare-gas-containing, nitrogen-based exhaust stream having a composition of gas species comprising (a) said rare gas, (b) gaseous impurities and (c) nitrogen (N2), said rare gas in an amount greater than 0 mol % and up to about 0.5 mol %, said gaseous impurities comprising (i) hydrofluorocarbons (ii) perfluorocarbons (iii) carbon monoxide (CO); (iv) hydrogen fluoride (HF); (v) silicon fluoride (SiF4); and (vi) carbon tetrafluoride (CF4), wherein each of said gaseous impurities of said hydrofluorocarbons, perfluorocarbons, CO, SiF4 and CF4 is in an amount greater than 0 mol % and up to about 1 mol %, and further wherein HF is in an amount greater than 0 mol % and up to about 2 mol %; pretreating the rare-gas-containing, nitrogen-based exhaust stream by introducing the rare-gas-containing, nitrogen-based exhaust stream into a pretreatment system, said pretreatment system comprising a burner, a scrubber and an adsorber, said pretreating comprising (x) combusting a substantial portion of the CO, the hydrofluorocarbons, the perfluorocarbons into combustion products comprising carbon dioxide (CO2) and water vapor (H2O) to create a diluted, rare-gas-containing, nitrogen-based exhaust stream; (y) removing substantially all of the HF and the SiF4 in the scrubber; and (z) adsorbing substantially all of the CO2 and the H2O onto an adsorbent to create a pretreated, diluted, rare-gas-containing, nitrogen-based exhaust stream; and withdrawing the pretreated, diluted, rare-gas-containing, nitrogen-based exhaust stream from an outlet of the adsorber of the pretreatment system, said pretreated, diluted, rare-gas-containing, nitrogen-based exhaust stream having a composition comprising the rare gas, the gaseous impurities and the N2, said rare gas in an amount greater than 0 mol % and less than about 0.05 mol %, and said gaseous impurities remaining after the step of pretreating comprising oxygen (O2) in an amount greater than 0.01 mol % and up to about 2 mol %, CF4 in an amount greater than 0 mol % and up to about 0.01 mol %, CO2 in an amount ranging from 0.00001 mol % and up to about 0.0005 mol %.

In an eighth aspect, a method of pretreating a rare-gas containing, nitrogen-based exhaust stream from an etch chamber, comprising: introducing a rare-gas-containing, nitrogen-based exhaust stream into a pretreatment system; and pretreating the rare-gas-containing, nitrogen-based exhaust stream by (x) combusting a substantial portion of combustible gaseous impurities into combustion products comprising carbon dioxide (CO2) and water vapor (H2O) to create a diluted, rare-gas-containing, nitrogen-based exhaust stream; (y) removing a substantial portion of corrosive fluorides; and (z) adsorbing substantially all of the CO2 and the H2O onto an adsorbent of to create a pretreated, diluted, rare-gas-containing, nitrogen-based exhaust stream.

The invention may include any of the aspects in various combinations and embodiments to be disclosed herein.

BRIEF DESCRIPTION OF THE DRAWINGS

The objectives and advantages of the invention will be better understood from the following detailed description of the preferred embodiments thereof in connection with the accompanying figures wherein like numbers denote the same features throughout and wherein.

DETAILED DESCRIPTION OF THE INVENTION

Figure 1:
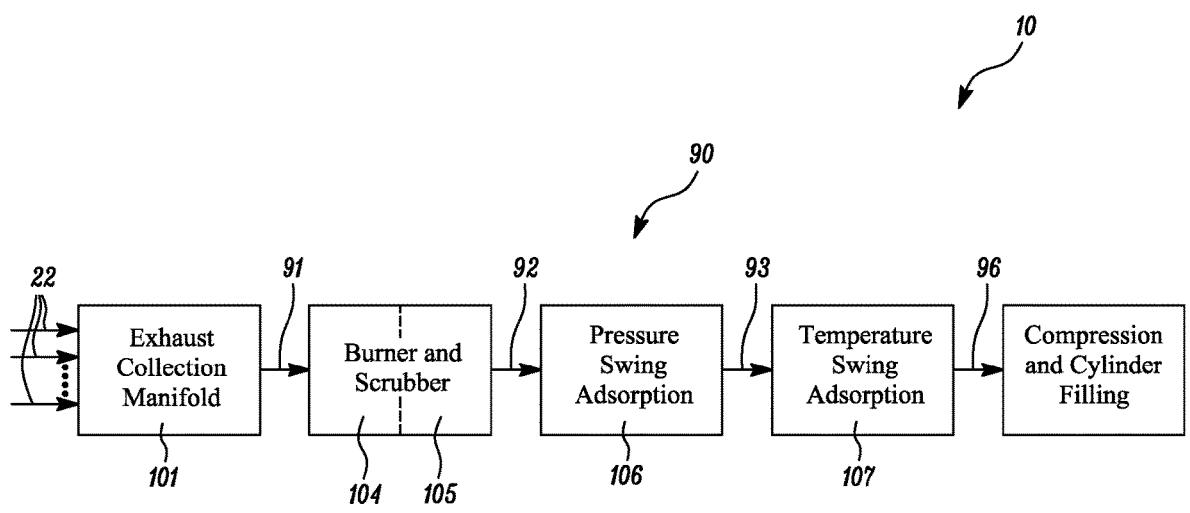
FIG. 1 illustrates a process schematic of an embodiment of a xenon pretreatment and recovery process in accordance with the principles of the present invention.

The advantages of the invention will be better understood from the following detailed description of the embodiments thereof in connection. The disclosure is set out herein in various embodiments and with reference to various aspects and features of the invention. It will be understood that the particular rare gas pretreatment and recovery methods and systems are shown by way of illustration and not as a limitation of the present invention. The principles and features of this invention may be employed in various and numerous embodiments in various permutations and combinations without departing from the scope of the invention. The disclosure may further be specified as comprising, consisting or consisting essentially of, any of such permutations and combinations of these specific features, aspects, and embodiments, or a selected one or ones thereof.

All percentages are expressed herein as molar percentages, unless specified otherwise.

"Removal efficiency" or "RE" as used herein and throughout the specification is expressed as follows: (Incoming flux of a target species−Outgoing flux of the target species)/(Incoming flux of the target species), where flux=Concentration*Total flow rate. The RE quantifies the removal efficiency of the various impurities in the rare-gas-containing, nitrogen-based exhaust stream that are removed in accordance with the principles of the present invention.

Where a range of values describes a parameter, all sub-ranges, point values and endpoints within that range or defining a range are explicitly disclosed therein, unless explicitly disclosed otherwise. All physical property, dimension, and ratio ranges and sub-ranges (including endpoints) between range end points for those physical properties, dimensions, and ratios are considered explicitly disclosed herein, unless explicitly disclosed otherwise.

"Conduit" as used herein and throughout refers to any type of tubular-like structure of any shape, including, by way of example, a tube, pipe, channel, duct or trough.

"Connected" or "operably connected" as used herein means a direct or indirect connection between two or more components by way of conventional piping and assembly, including, but not limited to valves and conduit, unless specified otherwise, so as to enable fluid, mechanical, chemical and/or electrical communication between the two or more components.

"Nitrogen-based exhaust stream(s)" as used herein and throughout refers to an exhaust stream in which nitrogen is the majority containing species in the exhaust stream whereby the nitrogen occupies 50 mol % or more based on total moles of the exhaust stream.

"Rare-gas-containing, nitrogen-based exhaust stream from an etch chamber" as used herein and throughout refers to a composition of gas species comprising a rare gas, gaseous impurities and nitrogen, with said rare gas in an amount greater than 0 mol % and up to about 0.5 mol %, said gaseous impurities comprising (i) hydrofluorocarbons represented by the general formula CxHyFz, where each of x, y and z can have any integers that range from 1 to 5, with the proviso that when x=1, y+z=4, and when x=2 to 5, y+z−2x=−2, 0 or 2, (ii) perfluorocarbons represented by the general formula CxFy where x can have any integer values from 2 to 5, where y−2x=−2, 0, or 2, (iii) carbon monoxide (CO), (iv) hydrogen fluoride (HF), (v) silicon fluoride (SiF4) and (vi) carbon tetrafluoride (CF4), wherein each of said gaseous impurities of said CxHyFz, CxFy, CO, SiF4 and CF4 is in an amount greater than 0 mol % and up to about 1 mol %, and further wherein HF is in an amount greater than 0 mol % and up to about 2 mol %. Alternatively, the "rare-gas containing, nitrogen-based exhaust stream from an etch chamber" as used herein and throughout can be characterized as having a composition of gas species comprising (a) said rare gas, (b) gaseous impurities and (c) nitrogen (N2), said rare gas in an amount greater than 0 mol % and up to about 0.5 mol %, said gaseous impurities comprising (i) hydrofluorocarbons (ii) perfluorocarbons (iii) carbon monoxide (CO); (iv) hydrogen fluoride (HF); (v) silicon fluoride (SiF4); and (vi) carbon tetrafluoride (CF4), wherein each of said gaseous impurities of said hydrofluorocarbons, perfluorocarbons, CO, SiF4 and CF4 is in an amount greater than 0 mol % and up to about 1 mol %, and further wherein HF is in an amount greater than 0 mol % and up to about 2 mol %.

"Signal" as used herein and throughout means any suitable control signal such as a wireless signal or hard wired signal which can be transmitted to and from a programmable logic controller.

The inventors have recognized that although xenon-containing, nitrogen-based exhaust streams from etch chambers are highly corrosive, reactive, and harmful, thereby making recovery of the xenon potentially hazardous and difficult, a careful pretreatment system and process utilizing a burner, scrubber and adsorption system can create a composition of the exhaust stream that is suitable for recovery in a xenon gas recovery unit located downstream of the pretreatment system. The present invention has the ability to pretreat and recover xenon from a xenon-containing, nitrogen-based exhaust stream exiting one or more etch chambers in connection with a fab operation.

In accordance with one aspect of the present invention, a pretreatment process is provided to ensure effective recovery of xenon in a downstream xenon recovery unit. FIG. 1 illustrates a process schematic of a xenon pretreatment and recovery system 90. The system 90 is designed to have a modular structure that can be assembled on-site at a semiconductor fabrication plant 10 (hereinafter, referred to as a "fab"). Additionally, the pretreatment and recovery system 90 can be constructed to be mobile and maneuvered as needed within the premises of the fab 10. The pretreatment and recovery system 90 includes a pretreatment system 100 and a recovery system 107. The pretreatment system 100 includes an exhaust collection manifold 101, a burner 104, a scrubber 105 and a pressure swing adsorber 106. The pretreatment system 100, as will be explained hereinbelow, removes certain gaseous impurities, some or all of which have been generated during the etch process, to enable downstream recovery of xenon from the contaminant-laden, nitrogen-based exhaust stream.

The recovery system 107 is a xenon recovery unit 107. The xenon recovery unit 107 is a temperature swing adsorption unit, as will be explained in greater detail below, that contains a AgX adsorbent that can selectively adsorb xenon preferentially over nitrogen and other impurities.

Figure 2:
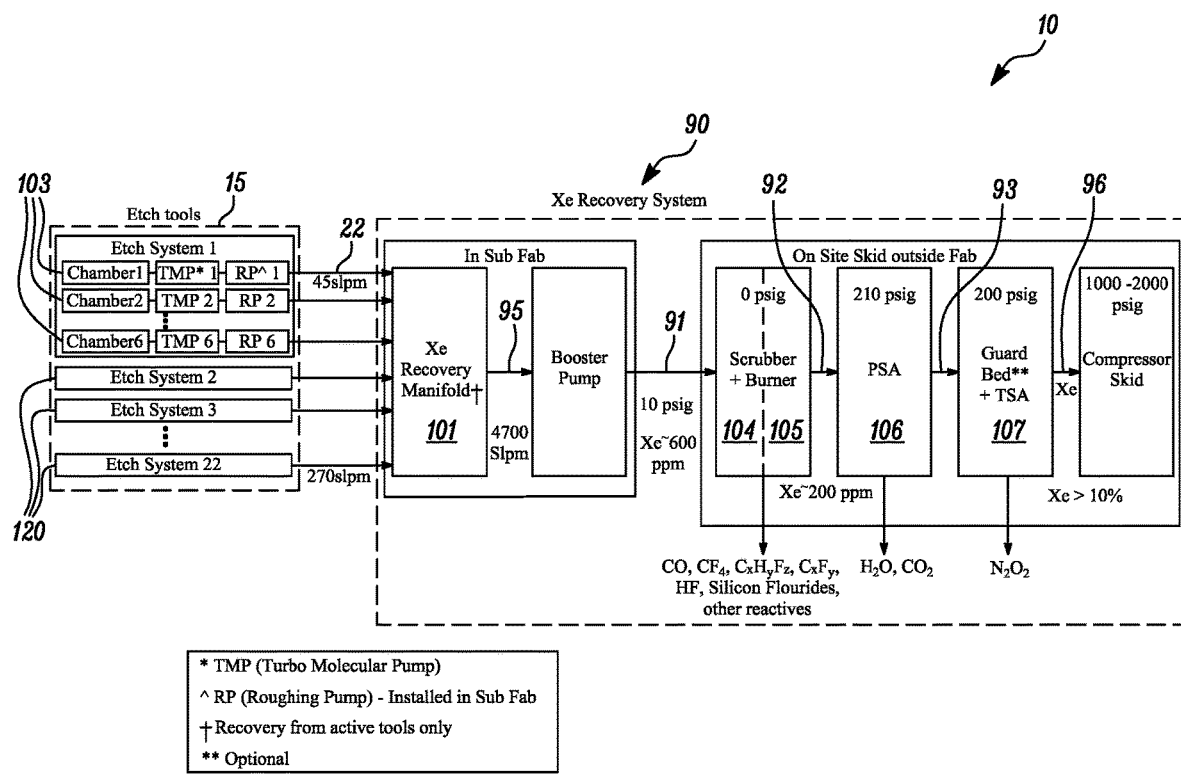
FIG. 2 illustrates a block flow diagram of an embodiment of a xenon pretreatment and recovery process in accordance with the principles of the present invention.

The pretreatment and recovery system 90 is connected to an etch tool 15, as shown in FIG. 2. FIG. 2, by way of example, and not intending to be limiting, shows one example of an etch tool 15 connected to the system 90. The etch tool 15 is comprised of multiple etch systems 120. A total of 22 etch systems 120 are shown (i.e., designated as 1-22 etch systems 120). The etch systems 120 are connected to the xenon pretreatment and recovery system 90. Each etch system 120 includes 6 etch chambers 103 configured in parallel relationship to each other. Each of the etch systems 120 can have any number of etch chambers 103. In the example of FIG. 2, with which the embodiments herein will be described, each etch system 120 has 6 etch chambers 103 (i.e., designated as 1-6 etch chambers 103), so that a total of 132 etch chambers 103 (i.e., designated as 1-132 etch chambers 103) are provided in etch tool 15, with each 1-132 etch chamber 103 having a dedicated conduit 140 that connects the etch chamber 103 located in a specific etch system 120 to an inlet of a collection manifold 101. A total of 132 etch conduits 140 are intended to be illustrated in FIG. 2 (i.e., designated as 1-132 conduits 140). It should be understood that FIG. 2 represents one possible arrangement of etch tool 15, with which the embodiments herein will be described. Other flow networks are contemplated. Any number of etch systems 120 can be utilized; and any number of etch chambers 103 within an etch system 120 can be utilized. The number of etch chambers 103 in an etch system 120 can be the same for each 1-22 etch system 120. Alternatively, the number of etch chambers 103 can vary from etch system 120 to etch system 120.

Each of the etch chambers 103 contains a turbo molecular pump and roughing pump which in combination can pull the necessary vacuum in the etch chamber 103 to perform the etch process. A portion of the 1-132 etch chambers 103 or all of the 1-132 etch chambers 103 within a particular 1-22 etch system 120 can be operationally active. The exact number of operationally active 1-132 etch chambers 103 is at least partially dependent upon the production requirements of the fab 10.

Still referring to FIG. 2, a xenon-containing, nitrogen-based gaseous stream is utilized to perform the etchant operation within one or more of the 1-132 etch chambers 103. As a result of the etch operations, certain gaseous impurities unique to the etchant process are generated. A significant amount of nitrogen is introduced into the etch system 120 and utilized to dilute the concentration of the gaseous impurities, and more particularly corrosives in the etch exhaust gas stream 22. Consequently, the xenon-containing etch exhaust stream 22 is nitrogen-based. An etch gas stream 22 exits a corresponding etch chamber 103 in an etch system 120. By way of example, a xenon-containing, nitrogen-based etch stream 22 with a flowrate of 45 slpm emerges from etch chamber 103 of etch system 120. Another xenon-containing, nitrogen-based etch stream 22 emerges from another etch chamber 103 of etch system 120. In this manner, multiple etch streams 22 can exit a specific etch system 120, depending on how may etch chambers 103 are operationally active within the etch system 120. FIG. 2 shows that each xenon-containing, nitrogen-based exhaust stream corresponds to an etch chamber 103.

Any flow rate for each of the etch streams 22 is contemplated. In one example, there are 6 etch streams 22, each of which exits a dedicated 1-6 etch chamber 103 of an etch system 120, at a flow rate of approximately 45 slpm. As a result, a maximum of approximately 270 slpm can emerge from a single etch system 120. The fab 10 of FIG. 2 includes a total of 22 etch systems 120, such that a maximum of 5940 slpm can enter pretreatment system 100. It should be understood that the pretreatment and recovery system 90 can be sized to handle any volume of xenon-containing, nitrogen-based exhaust gas streams 22 exiting each etch system 120 in the etch tool 15.

Some of the 1-22 etch systems 120 may be partially idle in which a portion of the etch 1-6 chambers 103 within an etch system 120 is not operationally active; fully idle in which all of the 1-6 chambers 103 within an etch system 120 are idle; or fully operational, in which all of the 1-6 etch chambers 103 within an etch system 120 is operational. Based on the specific condition, the amount of xenon-containing gas flowing out of a particular etch system 120 can vary from zero (all of the 6 etch chambers 103 are idle) to 270 slpm (assuming all of the 6 etch chambers 103 are operationally active, whereby each etch stream 22 has a flow rate of 45 slpm that exits from each of 1-6 etch chambers 103). Alternatively, an intermediate flow rate of xenon-containing gas flowing out of a particular etch system 120 between 0-270 slpm can occur as a result some of the 1-6 etch chambers 103 being in idle mode. Applicants have taken into account such wide range of operational conditions of the multiple 1-22 etch systems 120 to minimize the load of the pretreatment and recovery system 90 and thereby improve recovery of xenon, by designing a collection manifold 101 that only allows xenon-containing, nitrogen-based exhaust streams 22 into the collection manifold 101, and excludes non-xenon-containing streams into the collection manifold 101, as will be explained below.

Numerous means are contemplated for ensuring the exhaust collection manifold 101 only allows for entry of xenon-containing, nitrogen-based exhaust streams 22 into the collection manifold 101 of pretreatment system 100. In one example, a xenon mass flow controller located upstream of a particular 1-132 etch chamber 103 transmits a source signal to a dedicated three-way control valve located on the collection manifold 101. When the xenon mass flow controller detects the flow of xenon therethrough, a source signal is transmitted from the xenon mass flow controller to the dedicated 3-way control valve that causes the 3-way control valve to move from the closed position into the open position with respect to the collection manifold 101, thereby allowing a xenon-containing, nitrogen-based exhaust stream 22 exiting a particular 1-132 etch chamber 103 to flow into the collection manifold 101 and subsequently proceed into the pretreatment system 100. The three-way control valve is in the closed position with respect to an abatement system, thereby blocking flow of the xenon-containing, nitrogen-based exhaust stream 22 into the downstream abatement system.

Conversely, when the xenon mass flow controller has zero setpoint and detects no flow, nitrogen-based exhaust gas flowing therethrough, a source signal can be transmitted from the mass flow controller to the three-way control valve that causes it to remain in a closed position with respect to the collection manifold 101 and in an open position with respect to an abatement system, thereby directing the non-xenon-containing, nitrogen-based exhaust gas stream into the abatement system.

Alternatively, when the xenon mass flow controller does not detect a flow of any exhaust gas therethrough, no source signal may be transmitted from the xenon mass flow controller to the three-way control valve, thereby causing the three-way control valve to remain in the closed position relative to the collection manifold 101. As such, the default configuration for the three-way control valve is to remain in the closed position with respect to the collection manifold 101 when no signal is relayed to three-way control valve. In this scenario, a lack of any flow of exhaust gas from a corresponding 1-132 etch chamber 103 may be indicative of a particular 1-132 etch chamber 103 being idle, and as a result, no signal is sent to the three-way control valve.

In another embodiment, a sensing device may be utilized in place of the xenon mass flow controller. The sensing device is located within a conduit 140 extending between a particular etch chamber 103 and the collection manifold 101. In a first scenario, when the sensing device detects a presence of xenon flowing through the conduit 140, the sensing device can transmit a signal to a three-way control valve located on the collection manifold 101 that can cause the control valve to open and allow passage of the xenon-containing, nitrogen-based, exhaust streams 22 existing a corresponding etch chamber 103 into the collection manifold 101, while blocking flow into an abatement system. In a second scenario, when the sensing device does not detect xenon flowing therethrough, no signal may be sent to the three-way control valve, thereby maintaining the three-way control valve in the closed position relative to the collection manifold 101 and diverting the non-xenon, nitrogen-based, exhaust stream into an abatement system. In a third scenario, when the sensing device does not detect any flow of exhaust gas from a corresponding etch chamber 103, the system recognizes that the particular etch chamber 103 may be idle, and as a result, no signal is sent to the three-way control valve, thereby maintaining the three-way control valve in the closed position relative to the collection manifold 101.

It should be understood that other measurement, analytic and detection systems can be utilized to determine the presence of xenon in the exhaust streams, as may be known in the art, to ensure that only xenon-containing, nitrogen-based exhaust streams 22 from etch chambers 103 are allowed entry into the collection manifold 101.

The above mentioned embodiments represent so-called "smart switching" techniques that reduce, mitigate or eliminate introduction of non-xenon-containing, nitrogen-based, exhaust streams into the collection manifold 101 and pretreatment system 100. In this manner, by selectively excluding and/or diverting non-xenon-containing, nitrogen-based exhaust streams into an abatement system, the pretreatment and recovery system 90 is not overburdened with unnecessarily larger amounts of exhaust gas. Additionally, the recovery of xenon from the xenon-containing, nitrogen-based, exhaust streams 22 can occur without encountering the adverse effects of dilution which can occur by entry of non-xenon-containing, nitrogen-based exhaust streams into the pretreatment system 100. Still further, by utilizing an exhaust collection manifold 101 that collects only xenon-containing, nitrogen-based exhaust streams 22 from various etch systems 120, the variation of the concentration of xenon in the xenon-containing, nitrogen-based exhaust streams 22 received from etch chambers 120 can be minimized. The net effect in all instances is improved recovery of xenon from the xenon gas recovery unit 107 without over-loading the pretreatment and recovery system 90.

In this manner, the collection manifold 101 is configured to selectively receive only xenon-containing, nitrogen-based exhaust streams 22 from exhaust streams 22 exiting etch chambers 103 of a corresponding etch system 120 of the etch tool 15 in the fab 10, by the previously described "smart switching" feature. Additionally, the collection manifold 101 is characterized by a sufficient volume that can reduce, mitigate or eliminate back pressure to the corresponding etch chamber 103. As a result, no disruption is provided to any of the etch systems 120. The collection manifold 101 may have multiple inlets, each of which is operably connected to a particular upstream etch chamber 103 by way of a dedicated conduit 140. In other words, each 1-132 etch chamber 103 may have a dedicated 1-132 conduit 140 that connects to a dedicated inlet of the collection/recovery manifold 101.

Each of the xenon-containing, nitrogen-based exhaust streams 22 that is permitted to enter a specific inlet of the collection manifold 101 can enter therein with any flow rate. In one example, each of the selected etch streams 22 may have an incoming flow rate of 0 to 100 slpm with an aggregate total flow rate of all selected etch streams 22 of 0 to 13,200 slpm. In another example, each of the selected etch streams 22 may have an incoming flow rate of 10 to 80 slpm with an aggregate total flow rate of all selected etch streams of 1320 to 10,560 slpm. In yet another example, each of the selected etch streams 22 may have an incoming flow rate of 30 to 60 slpm with an aggregate total flow rate of all selected etch streams of 3960 to 7920 slpm.

FIG. 2 shows that the collection manifold 101 is connected to a booster pump that can be utilized to pressurize the xenon-containing, nitrogen-based exhaust streams 22. The outlet of the booster pump is operably connected to the downstream burner 104 and scrubber 105 unit. It should be understood that although FIG. 2 illustrates the burner 104 and scrubber 105 as a single unit, the operation of each is explained separately to more clearly describe the method by which the burner 104 and scrubber 105 combust and remove certain impurities, respectively. The xenon-containing, nitrogen-based exhaust streams 22 can exit collection manifold 101 as stream 95 and then enter into booster pump where it is pressurized to a suitable pressure for entry into a downstream burner 104. The pressurized stream (FIG. 2) emerges from booster pump as stream 91. In one example, stream 91 is pressurized to about 10 psig. The stream 91 can have a representative composition characterized by (i) hydrofluorocarbons with the general formula $C_xH_yF_z$, where each of x, y and z can have any values that are greater than 0, (ii) perfluorocarbons represented by the general formula $C_xF_y$ where x can have any value greater than 1 and y can have any value greater than 0, (iii) carbon monoxide (CO), (iv) hydrogen fluoride (HF), (v) silicon fluorides represented by the general formula $Si_xF_y$ where each of x and y can have any value greater than 0 and carbon tetrafluoride ($CF_4$). Each of such gaseous impurities $C_xH_yF_z$, $C_xF_y$, CO, $Si_xF_y$ and $CF_4$ is in an amount greater than 0 mol % and up to about 1 mol %, or, alternatively, greater than 0.0001 mol % and up to about 1 mol %, or, further alternatively greater than 0.0001 mol % and up to about 0.3 mol %. The HF can be in an amount that is greater than 0 mol % and up to about 2 mol %, or alternatively greater than 0.0001 mol % and up to about 2 mol %, or further alternatively greater than 0.0001 mol % and up about 0.5 mol %.

Stream 91 with the above-mentioned composition is directed into the pretreatment system 100 that includes a burner 104, a scrubber 105 and a pressure swing adsorber 106. As shown in FIG. 2 and by non-limiting example, stream 91 may comprise about 600 ppm of xenon. The xenon-containing, nitrogen-based exhaust stream 91 enters into burner 104. Excess oxygen or oxygen-enriched air can be fed into burner 104 in an amount to ensure that a substantial portion of the one or more hydrocarbons and the one or more hydrofluorocarbons are combusted into carbon dioxide and water vapor to create a diluted, xenon-containing, nitrogen-based exhaust stream. In one example, the excess oxygen or oxygen-enriched air is introduced into the burner 101 in an effective amount to dilute the xenon contained in stream 91 by no greater than a factor of about 2 to 3 times the amount of xenon in stream 91. The burner 104 is preferably operated at a temperature greater than 1120 C. The burner 104 (i) allows nearly 100% or complete combustion of combustible contaminants without (ii) unnecessarily introducing excess oxygen or excess oxygen-enriched air as to cause dilution of the xenon contained in stream 91 by a factor of greater than about 2-3 times the amount of xenon in stream 91. In other words, the dilution of the xenon is controlled to allow recovery of xenon by not allowing the xenon to be diluted beyond 2-3 times the initial amount of the xenon contained in stream 91 that is entering the burner 104. Balancing of these competing design considerations of a burner 104 is possible by the present invention. Conventional xenon gas recovery units have not implemented a burner system in the manner utilized by the present invention, due to a tendency for the combustion to cause excessive dilution of the xenon and the inability to consistently control the level of dilution of the xenon exiting the burner, thereby making recovery of the diluted xenon not possible.

With regards to the present invention, despite dilution of the xenon, which is expected to be no greater than about 2-3 times the amount of xenon contained in stream 91, Applicants have discovered that the burner 104 is robust for a pretreatment set-up, as combustible impurities are converted to easier-to-handle components such as $CO_2$ and $H_2O$, that can be removed more easily in the subsequent purification operations. The burner 104 can handle changes in the compositional make-up of the gaseous impurities contained in etch stream 22. Despite the dilution of xenon that occurs in the burner 104, when the burner 104 is paired with an adsorption process that uses a highly selective adsorbent for xenon, the integrated approach in the present invention is economically viable and effective for xenon recovery, even when stream 91 has a concentration of xenon that is 500-600 ppm or less.

The diluted, xenon-containing, nitrogen-based exhaust stream has a composition exiting the burner 104 that includes combustion products of $CO_2$ and $H_2O$ from the burner 104, along with HF, $Si_xF_y$ and $CF_4$. The diluted xenon-containing, nitrogen-based exhaust stream exits burner 104 and flows into an inlet of a wet scrubber 105 where substantially all of the corrosives consisting essentially of hydrogen fluoride and the silicon tetrafluoride (collectively, referred to as "fluorides") can be removed therein.

The diluted xenon-containing, nitrogen-based exhaust stream can be contacted with a suitable aqueous medium such as potassion hydroxide (KOH), aluminum nitrate nonahydrate (ANN), monobasic aluminum nitrate (monoban) or caustic (NaOH). The aqueous medium removes substantially all of the scrubbable fluorides from the diluted xenon-containing, nitrogen-based exhaust stream. Sufficient flowrate of the incoming diluted xenon-containing, nitrogen-based exhaust stream is provided. In one example, the scrubber 105 may comprise a single vertical packed tower, with a liquid injection manifold on top of the column of packing, and a demister pad or other demisting means thereover. The scrubber 105 may be fed with any suitable aqueous scrubbing medium, which may be chilled or at appropriate temperature, in relation to the diluted xenon-containing, nitrogen-based exhaust stream from the burner 104 and optionally subjected to quenching or preliminary cooling upstream of the scrubber 105. Sufficient contact of the aqueous scrubbing medium with the diluted, xenon-containing, nitrogen-based exhaust stream occurs to allow at least a substantial portion of the scrubbable fluorides to be absorbed into the aqueous scrubbing medium.

Additionally, the scrubber may incorporate a chiller which can stand next to the scrubber tower and pre-chill the scrubbing water or other aqueous scrubbing medium. In lieu of the use of demister pads or similar mechanical means for minimizing or eliminating residual mist (small size water droplets), scrubber units in the practice of the invention may be constructed to hydrodynamically minimize or substantially eliminate such mist component by subjecting the gas stream to contact with larger droplet water "knock-down" sprays to remove the mist component from the gas stream.

The use of chilled water in scrubbing is desirable, to chill the effluent gas stream to below ambient temperature, to thereby reduce the quantity of water vapor below prevailing ambient relative humidity conditions, e.g., in the environment of the semiconductor manufacturing operation, when the effluent gas stream derives from a semiconductor manufacturing tool. The use of chilled water is also desirable to introduce a thermophoretic effect to enhance acid gas absorption and particulate absorption in the packed column.

A representative composition of the stream 92 existing scrubber 105 as described for the example of FIG. 2 can include xenon in an amount less than about 0.05%, $CO_2$ in an amount of about 5-10%, $O_2$ in an amount of about 0.1-5%, $H_2O$ in an amount greater than 0% and up to 4% and $CF_4$ in an amount greater than 0% and up to about 0.01%. FIG. 2 generally shows the type of contaminants which are partially or fully removed from the burner 104 and scrubber 105, namely CO, $CF_4$, $C_xH_yF_z$, $C_xF_y$, HF, $Si_xF_y$.

A diluted xenon-containing, nitrogen-based exhaust stream 92 with reduced corrosives, hydrocarbons and hydrofluorocarbons emerge from an outlet of the scrubber 105 and is directed to a pressure swing adsorber (PSA) 106. The stream 92 is preferably boosted in pressure to at least about 50 psi but no greater than about 250 psi to enable effective adsorption of $H_2O$ and $CO_2$ in the PSA 106. The adsorption bed of the PSA 106 can achieve 99.99% removal of moisture and $CO_2$ with at least 90% xenon recovery. The pressure swing adsorption process can be operated using one or more adsorbent beds. The adsorbent bed(s) can be loaded with one or more layers of adsorbents selective for the impurities to be removed, such as, but not limited to $CO_2$ and $H_2O$, but intentionally designed with minimum selectivity for adsorption of the xenon, such as alumina, silica gel and/or zeolites. Reduction of pressure in the PSA 106 allows desorption of the $CO_2$ and $H_2O$ impurities, thereby allowing regeneration of the bed for subsequent usage. Substantially all of the $CO_2$ and $H_2O$ are adsorbed onto an adsorbent in the PSA 106, thereby creating an intermediate stream 93.

The removal efficiency (RE) for each of the gaseous impurities contained in stream 91 that is subsequently removed by the pretreatment system 100 is greater than 99%. Removal of the gaseous impurities by pretreatment system 100 creates a partially purified intermediate stream 93.

The intermediate stream 93 existing the PSA 106 can be characterized as a pretreated, diluted xenon-containing, nitrogen-based exhaust stream that has a composition comprising the xenon, the gaseous impurities and the balance $N_2$, in which the xenon has been diluted and is in an amount greater than 0 mol % and less than about 0.05 mol %, and the gaseous impurities remaining after the step of pretreating in the burner 104 and scrubber 105 comprises oxygen ($O_2$) in an amount greater than 0.01 mol % and up to about 2 mol %, $CF_4$ in an amount greater than 0 mol % and up to about 0.01 mol %, $CO_2$ in an amount ranging from 0.00001 mol % and up to about 0.0005 mol %. Intermediate stream 93 can be characterized as a gaseous intermediate product that has undergone partial purification from the PSA 106 and is subsequently cooled to a non-cryogenic temperature of less than 300K, preferably about 250K and more preferably about 200K. The cooling to a non-cryogenic temperature is performed so as not to liquefy the intermediate stream 93, yet create sufficiently cooler temperatures that favor adsorption of xenon as opposed to nitrogen or other gaseous impurities in intermediate stream 93 onto the adsorbent in the TSA 107. The TSA 107 bed is indirectly cooled from elevated temperature to ambient temperature with air. The cooling from ambient temperature to a desired non-cryogenic temperature of less than 300 K is performed by direct cooling with $N_2$ that is substantially free of contaminants. An optional guard bed as shown in FIG. 3 that is situated upstream of the TSA 107 can also be used to remove other impurities which may adversely impact the ability of the TSA 107 to selectively adsorb xenon in the temperatures swing adsorption unit (TSA) 107.

The pressure of the intermediate stream 93 entering the PSA 106 is substantially similar to the pressure of the stream 93 that exited out of the PSA 106, as a result of minimizing pressure drop losses along the flow network extending between the outlet of the PSA 106 and the inlet of the TSA 107.

Intermediate stream 93 enters an inlet of the TSA 107 and comes into contact with the adsorbent. The xenon in intermediate stream 93 is preferentially and selectively adsorbed on an adsorbent that is designed to selectively adsorb xenon over nitrogen and the other gaseous impurities in intermediate stream 93. The adsorbent bed(s) can be loaded with adsorbents selective for desired rare gas xenon such as silver ion exchanged zeolite of type X, the low silica variant of type X zeolite, wherein the ion exchange level is at least 80% Ag on an equivalent basis. In a preferred embodiment, the adsorbent of the TSA 107 is AgX. Further details of AgX and other suitable adsorbents for xenon are described in U.S. Pat. No. 10,295,255, which is incorporated by reference herein in its entirety for all purposes.

Prior to entry of intermediate stream 93 into the TSA 107, the stream 93 and the AgX adsorber is cooled to the same non-cryogenic temperatures mentioned hereinabove to ensure optimal selectivity of Xe over N2 and other gaseous impurities in the intermediate stream 93. In one preferred manner of operation, the temperature of AgX is reduced in temperature to about 200K. As a result of the selectivity of the AgX adsorbent for xenon, the nitrogen and the gaseous impurities are not adsorbed on the AgX, and instead are free to flow through an outlet of the TSA 107, while substantially all of the xenon contained in intermediate stream 93 is preferentially adsorbed onto the AgX. In one embodiment, to ensure that all of the available, active sites on the AgX adsorbent for xenon to adsorb are utilized, the feeding of intermediate stream 93 into the TSA can be maintained until the xenon concentration in the outlet product stream 96 is greater than or equal to 5% of the xenon feed concentration contained in intermediate stream 93. However, it should be understood that the duration for adsorption can continue longer or shorter than the time required to reach 5% xenon breakthrough. Contrary to U.S. Pat. No. 10,295,255, the adsorption bed as utilized by the present invention does not need to be operated to near full breakthrough with xenon, to enable a deep rejection of other gaseous impurities contained in intermediate stream 93 prior to regeneration. The present invention can operate in a more flexible manner than described in U.S. Pat. No. 10,295,255 whereby the xenon adsorption can occur such that although there may remain some adsorption capacity or active sites on the AgX for other impurities (e.g., CF4), and nitrogen in intermediate stream 93 the present invention incorporates a robust burner and scrubber process to eliminate many of the problematic contaminants (e.g., hydrocarbons, perfluorocarbons, HF, SixFy and reduced levels of CF4) which would otherwise pose an issue for AgX selectivity of xenon over other gaseous impurities and nitrogen in intermediate stream 93. By pretreatment of the problematic contaminants as described herein, the present invention can take advantage of effective xenon recovery in a timely manner without having to operate to a certain level of breakthrough of xenon at the outlet of the TSA 107. Since the concern for the deep rejection of contaminants from the AgX is eliminated, excess amounts of xenon do not breakthrough, thereby improving the amount of xenon that is recovered by AgX. As such, the present invention operates in a manner to reduce the loss of xenon through the adsorbent bed of the TSA 107, which allows a greater fraction of the xenon contained in exhaust streams 22 to be recovered at acceptable product purity levels.

The choice of adsorption temperature when operating the TSA 107 ranges from 150K to 300K, and preferentially less then 250K, such as, by way of example, about 200K. Intermediate stream 93 is in the gas phase.

Recovery of the purified xenon product occurs by regeneration of the AgX adsorbent bed to produce a product stream 96 of xenon. The regeneration requires the step of increasing the temperature of the AgX adsorbent bed to at least 350K, and as high as about 550K. Heating of the bed can be achieved with various methods such as indirect heating methods. Alternatively, or in addition thereto, a purge gas with sufficiently elevated temperature can be utilized to improve the amount of xenon that is desorbed as product stream 96. The purge gas can comprise nitrogen, and/or argon or mixtures thereof. However, to obtain the highest attainable concentration of xenon in product stream 96, excessive amounts of warm purge gas such as $N_2$ and/or Ar or mixtures thereof is preferably avoided when the purge gases are used to assist in the desorption of xenon.

The heating of the bed causes the xenon to desorb from the AgX as a xenon-containing product stream 96. The product stream 96 has a composition that comprises xenon in an amount of greater than about 10 mol %, carbon dioxide in an amount that is up to 0.5 mol %, oxygen in an amount that is less than about 2 mol %, carbon tetrafluoride in an amount that is less than about 1 mol %. The xenon product stream 96 is preferably at least 20 times the xenon concentration that is contained in exhaust stream(s) 22 entering the collection manifold 101.

The xenon product stream 96 can be compressed into cylinders FIG. 2 which can then be sent for further purification (e.g. a refinery) to remove the problematic contaminants, after which the xenon product will have electronics grade purity suitable for reuse as an etch gas in etch tool 15. If purity is determined to be acceptable (e.g., electronics purity grade), the product stream 96 can be reused onsite as an etch gas for the etch tool 15 without the need for further processing and purification. Measurement instrumentation as known in the art can be employed to determine the purity level of xenon in the cylinder either before, during or after filling of the cylinders with xenon product stream 96 exiting the TSA 107.

After xenon has been recovered in product stream 96, the AgX bed is cooled to preferably below 250K with a cryogenic fluid. The fluid is substantially free of rare gas and other adsorbable components. The cooling fluid comprises nitrogen gas and/or liquid.

The feeding, adsorption and desorption steps occur in a cyclic manner. The TSA 107 can be used in conjunction with other adsorbents and/or processes which can help remove harmful impurities from the feed stream that could impact the xenon adsorption capability of xenon recovery adsorbent material, such as the illustrated optional guard bed in FIG. 2. Additionally, it should be understood that the TSA 107 can be operated using one or more adsorbent beds. When the present invention is practiced with two or more adsorbent beds, the phasing of operation of the beds can be varied such that the on-line period of the first bed begins when the second bed comes off-line to minimize fluctuation in output. Alternatively, the cycles may be phased so that there are overlaps between the on-line periods of the first and the second adsorbent beds.

It should be noted that the pretreatment step of the present invention is characterized by an absence of a catalytic decomposition or a catalytic plasma decomposition. While catalyst based decomposition methods can reduce decomposition temperatures with less energy consumption and sufficient RE of the gaseous impurities, such processes are sensitive to changes in exhaust composition and subject to fouling or poisoning. Catalyst replacement due to fouling or poisoning is costly and also requires significant downstream of the fab system.

Additionally, the pretreatment step of the present invention does not employ non-equilibrium or thermal plasmas. In a non-equilibrium plasma, lower RE's of the gaseous impurities generated during the etch process are created. Thermal plasmas require high temperatures of greater than 2500 C to create the plasma; as a result, the hardware is susceptible to thermal damage and degradation, which can shorten the plasma operational lifetime even if additional cooling gas is utilized. In general, plasma systems are limited to point-of-use with small capacities. The plasma torch lifetime and capacity can be issues in fab-wide pretreatment and recovery operations. As a result, for these reasons, the inventors of the present invention have recognized that the plasma processes are not robust enough for usage in a large pretreatment system where the exhaust stream is an etch stream that contains corrosive and reactive species.

Alternative embodiments are contemplated by the present invention. Specifically, although the present invention has been described with reference to a xenon-containing, nitrogen-based exhaust stream, the pretreatment system of the present invention may be utilized with other rare gases. As an example, the rare gas comprises krypton and the recovery gas unit for the krypton is a cryo-distillation column instead of a TSA. The composition of a rare-gas-containing, nitrogen-based exhaust stream in which the rare gas is krypton or xenon or another rare gas can be generally represented as a composition of gas species comprising (a) said rare gas, (b) gaseous impurities and (c) nitrogen (N2), wherein said rare gas is in an amount greater than 0 mol % and up to about 0.5 mol %, said gaseous impurities comprising (i) hydrofluorocarbons represented by the general formula CxHyFz, where each of x, y and z are integers that range from 1 to 5, with the proviso that when x=1, y+z=4, and when x=2 to 5, y+z−2x=−2, 0 or 2; (ii) perfluorocarbons represented by the general formula CxFy where x can have any integer values from 2 to 5, where y−2x=−2, 0, or 2; (iii) carbon monoxide (CO); (iv) hydrogen fluoride (HF); (v) silicon fluoride (SiF4); and (vi) carbon tetrafluoride (CF4), and further wherein each of said gaseous impurities of said CxHyFz, CxFy, CO, SiF4 and CF4 is in an amount greater than 0 mol % and up to about 1 mol %, and where HF is in an amount greater than 0 mol % and up to about 2 mol %.

The lower level for each of the hereinbefore mentioned gaseous impurities in streams 22 may be 0.0001 mol % or lower, or 0.0001 mol % or higher.

The above description merely represents one possible arrangement of the burner 104 and scrubber 105. It will be appreciated that a wide variety of other burners and scrubbers may be utilized as part of the pretreatment system 100 and that the construction, arrangement and operation of the burner 104 and scrubber 105 may be widely varied to effect treatment of the gas discharged from the tools and manufacturing operations of the upstream fab 10. Other designs for scrubber can be used.

An alternative scrubber unit comprises a falling film acid absorption column with chilled water feeding a shell-side of the absorption column. With such scrubber unit, liquid from the pre-treatment unit, the quencher, and the scrubber unit may be channeled to drain into a common reservoir on the bottom of the scrubber column. In such manner, the used liquid streams from the effluent gas treatment system are consolidated, and such reservoir may be arranged for gravity feed operation thereof.

Alternatively, the scrubbing liquid and other liquid streams from the constituent process units in the effluent gas treatment system may be pressurized or discharged from the system by suitable pumping means, such as a centrifugal pump, peristaltic pump, air-driven pump, water-fed eductor, or other suitable liquid motive driver means.

It should be understood that the PSA as part of the pretreatment system can be substituted with a TSA as known in the art, whereby the TSA has an adsorbent layer of alumina, a molecular sieve, carbon or a combination thereof for purposes of removing CO2 and H2O as well as trace contaminants that may interfere with downstream rare gas recovery. Other suitable adsorbent systems are contemplated.

Additionally, although the present invention has been described with regards to a nitrogen-based exhaust stream, other inert based exhaust streams besides nitrogen are contemplated. For example, an exhaust stream that is argon-based may be utilized.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:

1. A method for pretreating a rare-gas-containing, nitrogen-based exhaust stream exiting an etch chamber, prior to recovery of the rare gas from the rare-gas-containing, nitrogen-based exhaust stream, said method comprising the steps of:

receiving the rare-gas-containing, nitrogen-based exhaust stream from the etch chamber, said rare-gas-containing, nitrogen-based exhaust stream having a composition of gas species comprising (a) said rare gas, (b) gaseous impurities and (c) nitrogen (N2), said rare gas in an amount greater than 0 mol % and up to about 0.5 mol %, said gaseous impurities comprising (i) hydrofluorocarbons represented by the general formula CxHyFz, where each of x, y and z are integers that range from 1 to 5, with the proviso that when x=1, y+z=4, and when x=2 to 5, y+z−2x=−2, 0 or 2; (ii) perfluorocarbons represented by the general formula CxFy where x can have any integer values from 2 to 5, where y−2x=−2, 0, or 2; (iii) carbon monoxide (CO); (iv) hydrogen fluoride (HF); (v) silicon fluoride (SiF4); and (vi) carbon tetrafluoride (CF4), wherein each of said gaseous impurities of said CxHyFz, CxFy, CO, SiF4 and CF4 is in an amount greater than 0 mol % and up to about 1 mol % and HF is in an amount greater than 0 mol % and up to about 2 mol %;

pretreating the rare-gas-containing, nitrogen-based exhaust stream by introducing the rare-gas-containing, nitrogen-based exhaust stream into a pretreatment system, said pretreatment system comprising a burner, a scrubber and an adsorber to (x) combust a substantial portion of the CO, CxHyFz and the CxFy into combustion products comprising carbon dioxide (CO2) and water vapor (H2O) to create a diluted, rare-gas-containing, nitrogen-based exhaust stream; (y) remove substantially all of the HF and the SiF4 in the scrubber; and (z) adsorb substantially all of the CO2 and the H2O onto an adsorbent to create a pretreated, diluted, rare-gas-containing, nitrogen-based exhaust stream; and withdrawing the pretreated, diluted, rare-gas-containing, nitrogen-based exhaust stream from an outlet of the adsorber of the pretreatment system, said pretreated, diluted, rare-gas-containing, nitrogen-based exhaust stream having a composition comprising the rare gas, the gaseous impurities and the N2, said rare gas in an amount greater than 0 mol % and less than about 0.05 mol %, and said gaseous impurities remaining after the step of pretreating comprising oxygen (O2) in an amount greater than 0.01 mol % and up to about 2 mol %, CF4 in an amount greater than 0 mol % and up to about 0.01 mol %, CO2 in an amount ranging from 0.00001 mol % and up to about 0.0005 mol %.

2. The method of claim 1, wherein the pretreatment is characterized by an absence of a plasma decomposition step, a catalytic decomposition step and a catalytic plasma decomposition step.

3. The method of claim 1, wherein the pretreatment step comprises a process sequence of introducing the rare-gas-containing, nitrogen-based exhaust stream into an inlet of the burner, followed by an inlet of the scrubber and subsequently into an inlet of the adsorber, wherein said scrubber is characterized as a wet scrubber.

4. The method of claim 1, wherein the step of receiving the rare-gas-containing, nitrogen-based exhaust gas stream from the etch chamber further comprises:
    collecting one or more of the rare-gas-containing, nitrogen-based exhaust gas streams from corresponding rare-gas-containing etch chambers, while excluding collecting of one or more gas streams each without the rare gas from corresponding etch chambers; and
    directing the one or more of the rare-gas-containing, nitrogen-based exhaust gas streams into the inlet of the burner of the pretreatment system.

5. The method of claim 1, wherein the step of combusting further comprises introducing oxygen enriched air or excess oxygen into the burner in an effective amount to dilute the rare gas exiting the pretreatment system by about two to three times an amount of the rare gas entering the pretreatment system.

6. The method of claim 1, further comprising pressurizing the diluted, rare-gas-containing, nitrogen-based exhaust stream after exiting the scrubber to a pressure suitable to feed into the adsorber.

7. The method of claim 1, wherein the amount of each of said CxHyFz, CxFy, CO, HF, SiF4 and CF4 in the rare-gas-containing, nitrogen-based exhaust stream received from the etch chamber has a lower limit that is at least 0.0001 mol %.

8. The method of claim 1, wherein the pretreated, diluted, rare-gas-containing, nitrogen-based exhaust stream enters into a rare gas recovery unit at a first non-cryogenic temperature ranges from about 200K to about 300K, and further wherein the rare gas comprises xenon.

9. The method of claim 1, wherein each of the gaseous impurities is removed with a removal efficiency (RE) of greater than about 99%.

10. The method of claim 1, further comprising directing the pretreated, diluted, rare-gas-containing, nitrogen-based exhaust stream into a rare gas recovery unit.

11. A method for pretreating and recovering xenon from a nitrogen-based exhaust stream exiting an etch chamber, comprising the steps of:
    receiving a xenon-containing, nitrogen-based exhaust stream from an etch chamber, said xenon-containing, nitrogen-based exhaust stream having a composition of gas species comprising the xenon, gaseous impurities and nitrogen, said xenon in an amount greater than 0 mol % and up to about 0.5 mol %, and said gaseous impurities comprising hydrofluorocarbons, perfluorocarbons, carbon monoxide (CO), hydrogen fluoride, silicon fluorides and carbon tetrafluoride; wherein each of said gaseous impurities of said hydrofluorocarbons, perfluorocarbons, carbon monoxide, silicon fluorides and carbon tetrafluoride is in an amount greater than 0 mol % and up to about 1 mol %, and further wherein said hydrogen fluoride is in an amount greater than 0 mol % and up to about 2 mol %;
    pretreating the xenon-containing, nitrogen-based exhaust stream by introducing the same into a pretreatment system, said pretreatment system comprising a burner, a scrubber and an adsorber to (x) combust a substantial portion of the hydrofluorocarbons and the perfluorocarbons and the carbon monoxide into combustion products comprising carbon dioxide and water vapor to create a diluted, xenon-containing, nitrogen-based exhaust stream, (y) remove substantially all of the hydrogen fluoride and the silicon fluorides in the scrubber, and (z) adsorb substantially all of the carbon dioxide and the water vapor onto an adsorbent of the adsorber to create a pre-treated, diluted xenon-containing, nitrogen-based exhaust stream;
    withdrawing the pretreated, diluted, xenon-containing, nitrogen-based exhaust stream from an outlet of the adsorber, said pretreated, diluted, xenon-containing, nitrogen-based exhaust stream having a composition comprising said xenon, said gaseous impurities and said nitrogen, wherein said xenon is in an amount greater than 0 mol % and less than about 0.05 mol %, and said gaseous impurities remaining after the pretreatment comprises oxygen in an amount greater than 0.01 mol % and up to about 2 mol %, carbon tetrafluoride in an amount greater than 0 mol % and up to about 0.01 mol %, carbon dioxide in an amount ranging from 0.00001 mol % up to about 0.0005 mol %;
    cooling the pretreated, diluted xenon-containing, nitrogen-based exhaust stream to a first non-cryogenic temperature; followed by
    introducing the pretreated, diluted, xenon-containing, nitrogen-based exhaust stream into a temperature swing adsorber (TSA) containing an adsorbent bed therein, wherein said adsorbent bed contains an AgX adsorbent; and
    adsorbing the xenon onto the AgX adsorbent preferentially over the gaseous impurities in the pretreated, diluted, xenon-containing, nitrogen-based exhaust stream that are remaining after the step of pretreating.

12. The method of claim 11, further comprising directing the pretreated, diluted, xenon-containing, nitrogen-based exhaust stream into a guard bed to remove impurities prior to performing the step of pretreating.

13. The method of claim 11, further comprising:
    (i) maintaining the step of introducing the pretreated, diluted xenon-containing, nitrogen-based exhaust stream into the TSA containing the AgX adsorbent therein for a predetermined time;
    (ii) increasing a temperature of the AgX adsorbent with an optional purge gas to a temperature effective to desorb said xenon from the AgX adsorbent in said adsorbent bed and create a product stream; and
    (iii) cooling the adsorption bed with a purge fluid that is substantially free of xenon and other impurities capable of being adsorbed onto the AgX adsorbent.

14. The method of claim 13, wherein a composition of the product stream comprises xenon in an amount of greater than about 10 mol %, carbon dioxide in an amount that is up to 0.5 mol %, oxygen in an amount that is less than about 2 mol %, and carbon tetrafluoride in an amount that is less than about 1 mol %.

15. The method of claim 13, further comprising:
    collecting the xenon that is desorbed from the AgX adsorbent; and
    pressurizing the xenon to fill into a cylinder.

16. The method of claim 13, further comprising repeating the steps of (i), (ii) and (iii) in a cyclic manner.

17. The method of claim 11, wherein each of the gaseous impurities is removed in the pretreatment system with a removal efficiency (RE) of greater than 99%.

18. A method for pretreating and recovering a rare gas from a nitrogen-based exhaust stream exiting an etch chamber and recovering the rare gas from the nitrogen-based exhaust stream exiting the etch chamber, comprising the steps of:
- receiving a rare-gas-containing, nitrogen-based exhaust stream from an etch chamber, said rare-gas-containing, nitrogen-based exhaust stream having a composition of gas species comprising the rare gas, gaseous impurities and nitrogen, said rare gas in an amount greater than 0 mol % and up to about 0.5 mol %, said gaseous impurities comprising (i) hydrofluorocarbons represented by the general formula $C_xH_yF_z$, where each of x, y and z can have any integers that range from 1 to 5, with the proviso that when x=1, y+z=4, and when x=2 to 5, y+z−2x=−2, 0 or 2, (ii) perfluorocarbons represented by the general formula $C_xF_y$ where x can have any integer values from 2 to 5, where y−2x=−2, 0, or 2, (iii) carbon monoxide (CO), (iv) hydrogen fluoride (HF), (v) silicon fluoride ($SiF_4$) and (vi) carbon tetrafluoride ($CF_4$), wherein each of said gaseous impurities of said $C_xH_yF_z$, $C_xF_y$, CO, $SiF_4$ and $CF_4$ is in an amount greater than 0 mol % and up to about 1 mol %, and HF is in an amount greater than 0 mol % and up to about 2 mol %;
- pretreating the rare-gas-containing, nitrogen-based exhaust stream by introducing the rare-gas-containing, nitrogen-based exhaust stream into a pretreatment system, said pretreatment system comprising a burner, a scrubber and an adsorber to (x) combust a substantial portion of the $C_xH_yF_z$ and the $C_xF_y$ into combustion products comprising carbon dioxide ($CO_2$) and water vapor ($H_2O$) to create a diluted, rare-gas-containing, nitrogen-based exhaust stream, (y) remove substantially all of the HF and the $SiF_4$ in the scrubber, and (z) adsorb substantially all of the $CO_2$ and the $H_2O$ onto an adsorbent of the adsorber to create a pretreated, diluted, rare-gas-containing, nitrogen-based exhaust stream;
- withdrawing the pretreated, diluted, rare-gas-containing, nitrogen-based exhaust stream from an outlet of the adsorber, said pretreated, diluted, rare-gas containing, nitrogen-based exhaust stream having a composition comprising the rare gas, the gaseous impurities and the nitrogen, said rare gas in an amount greater than 0 mol % and less than about 0.05 mol % xenon, and said gaseous impurities remaining after the pretreatment comprising oxygen ($O_2$) in an amount greater than 0.01 mol % and up to about 2 mol %, $CF_4$ in an amount greater than 0 mol % and up to about 0.01 mol % and $CO_2$ in an amount ranging from 0.00001 mol % up to about 0.0005 mol %;
- cooling the pretreated, diluted, rare-gas-containing, nitrogen-based exhaust stream to a first noncryogenic temperature; followed by
- introducing the pretreated, diluted, rare-gas-containing, nitrogen-based exhaust stream into a rare gas recovery unit; and
- recovering the rare gas from the diluted, rare-gas-containing, nitrogen-based exhaust stream.

19. The method of claim 18, wherein (i) the recovery gas unit is a temperature swing adsorber (TSA) when the rare gas comprises xenon and (ii) the recovery gas unit is a cryo-distillation column when the rare gas comprises krypton.

20. The method of claim 18, wherein the rare gas is xenon, and further comprising adsorbing the xenon onto the AgX adsorbent preferentially over the gaseous impurities in the pretreated, diluted xenon-containing nitrogen based exhaust stream that are remaining after the step of pretreating.

21. A pretreatment system for pretreating a rare-gas-containing, nitrogen-based exhaust stream exiting an etch chamber, prior to recovery of the rare gas from the rare-gas-containing, nitrogen-based exhaust stream, said pretreatment system comprising:
- a collection manifold having an inlet operably connected to upstream etch chambers and an outlet operably connected to a pretreatment system, said collection manifold configured to receive a signal from each of the upstream etch chambers, said signal indicative of the presence or non-presence of the rare gas in an exhaust stream generated from one of the corresponding upstream etch chambers, said collection manifold in response to said signal configured to receive the rare-gas containing, nitrogen-based exhaust stream, and said collection manifold in response to said signal configured to exclude receiving a non-rare-gas, nitrogen-based exhaust stream devoid of the rare gas; and
- the pretreatment system comprising a burner, a scrubber and a adsorber, said pretreatment system configured to (i) combust a substantial portion of carbon monoxide, hydrofluorocarbon and perfluorocarbon impurities into carbon dioxide and water vapor, (ii) remove a substantial portion of hydrogen fluoride and silicon tetrafluoride impurities in the scrubber, and (iii) adsorb substantially all of the carbon dioxide and the water vapor onto an adsorbent of the adsorber so as to create a pretreated, diluted, rare-gas containing, nitrogen-based exhaust stream.

22. The pretreatment system of claim 21, wherein said pretreatment system is characterized by an absence of a plasma decomposition unit, a catalytic decomposition unit and a catalytic plasma decomposition unit.

23. The system of claim 21, wherein the pretreatment system comprises the burner upstream of the scrubber and the scrubber situated upstream of the adsorber, and further wherein the scrubber is characterized as a wet scrubber.

24. A system for pretreating and recovering xenon from a xenon-containing, nitrogen-based exhaust stream exiting an etch chamber, comprising:
- a collection manifold having an inlet operably connected to upstream etch chambers and an outlet operably connected to a pretreatment system, said collection manifold configured to receive a signal from each of the upstream etch chambers, said signal indicative of the presence or non-presence of xenon in an exhaust stream generated from one of the corresponding upstream etch chambers, said collection manifold in response to said signal configured to receive a xenon-containing, nitrogen-based exhaust stream, and said collection manifold in response to said signal configured to exclude receiving a non-xenon-containing, nitrogen-based exhaust stream;
- the pretreatment system comprising a burner, a scrubber and a adsorber, said pretreatment system configured to (i) combust a substantial portion of first impurities comprising carbon monoxide, hydrofluorocarbon and perfluorocarbon into carbon dioxide and water vapor, (ii) remove a substantial portion of second impurities comprising hydrogen fluoride and silicon tetrafluoride in the scrubber, and (iii) adsorb a substantial portion of third impurities comprising the carbon dioxide and the water vapor onto an adsorbent of the adsorber to create a pretreated, diluted xenon-containing, nitrogen-based exhaust stream; and a temperature swing adsorber (TSA) containing an adsorbent bed therein, wherein said adsorbent bed contains an AgX adsorbent, said TSA having an inlet that is operably connected to an outlet of the adsorber, said TSA configured to receive the pretreated, diluted, xenon-containing, nitrogen-based exhaust stream from the outlet of the adsorber for preferential recovery over the first, the second and third impurities of substantially all of the xenon in the xenon-containing, nitrogen-based exhaust stream.

25. The system of claim 24, wherein said TSA has an outlet operably connected to a compression and cylinder filling system.

26. The system of claim 24, said system configured to recover a product stream of the xenon having a concentration that is at least 20 times greater than the xenon-containing, nitrogen-based exhaust stream exiting the etch chamber.

27. The system of claim 24, further comprising a guard bed situated between the adsorber and the TSA.

28. The system of claim 24, further comprising a compressor situated between the adsorber and the TSA.

29. A system for pretreating and recovering a rare gas from a rare-gas-containing, nitrogen-based exhaust stream exiting an etch chamber, comprising:
a collection manifold having an inlet operably connected to upstream etch chambers and said collection manifold having an outlet that is operably connected to a pretreatment system, said collection manifold configured to receive a signal from each of the upstream etch chambers, said signal indicative of the presence or non-presence of the rare gas in an exhaust stream generated from one of the corresponding upstream etch chambers, said collection manifold in response to said signal configured to receive a rare-gas-containing, nitrogen-based exhaust stream, and said collection manifold in response to said signal is configured to exclude receiving a non-rare-gas-containing, nitrogen-based exhaust stream;
the pretreatment system comprising a burner, a scrubber and a adsorber, said pretreatment system configured to (i) combust a substantial portion of first impurities comprising carbon monoxide, hydrofluorocarbon and perfluorocarbon impurities into carbon dioxide and water vapor, (ii) remove a substantial portion of second impurities comprising hydrogen fluoride and silicon tetrafluoride in the scrubber, and (iii) adsorb a substantial portion of third impurities of the carbon dioxide and the water vapor onto an adsorbent of the adsorber to create a pretreated, diluted, rare-gas-containing, nitrogen-based exhaust stream; and
a rare gas recovery unit configured to receive the pretreated, diluted, rare gas, nitrogen-based exhaust stream from the outlet of the adsorber for preferential recovery over the first, the second and the third impurities of substantially all of the rare gas from the rare-gas-containing, nitrogen-based exhaust stream.

30. The system of claim 29, wherein (i) the rare gas recovery unit is a temperature swing adsorber (TSA) when the rare gas comprises xenon, said TSA containing an adsorbent bed therein, wherein said adsorbent bed contains an AgX adsorbent, and (ii) the rare gas recovery unit is a cryo-distillation column when the rare gas comprises krypton.

31. The system of claim 29, wherein the collection manifold is configured to re-direct the non-rare-gas-containing, nitrogen-based exhaust stream into an abatement system or other system for capturing the same.

32. A method for pretreating a rare-gas-containing, nitrogen-based exhaust stream exiting an etch chamber, prior to recovery of the rare gas from the rare-gas-containing, nitrogen-based exhaust stream, said method comprising the steps of:
receiving the rare-gas-containing, nitrogen-based exhaust stream from the etch chamber, said rare-gas-containing, nitrogen-based exhaust stream having a composition of gas species comprising (a) said rare gas, (b) gaseous impurities and (c) nitrogen (N2), said rare gas in an amount greater than 0 mol % and up to about 0.5 mol %, said gaseous impurities comprising (i) hydrofluorocarbons (ii) perfluorocarbons (iii) carbon monoxide (CO); (iv) hydrogen fluoride (HF); (v) silicon fluoride (SiF4); and (vi) carbon tetrafluoride (CF4), wherein each of said gaseous impurities of said hydrofluorocarbons, perfluorocarbons, CO, SiF4 and CF4 is in an amount greater than 0 mol % and up to about 1 mol %, and further wherein HF is in an amount greater than 0 mol % and up to about 2 mol %;
pretreating the rare-gas-containing, nitrogen-based exhaust stream by introducing the rare-gas-containing, nitrogen-based exhaust stream into a pretreatment system, said pretreatment system comprising a burner, a scrubber and an adsorber, said pretreating comprising (x) combusting a substantial portion of the CO, the hydrofluorocarbons, the perfluorocarbons into combustion products comprising carbon dioxide (CO2) and water vapor (H2O) to create a diluted, rare-gas-containing, nitrogen-based exhaust stream; (y) removing substantially all of the HF and the SiF4 in the scrubber; and (z) adsorbing substantially all of the CO2 and the H2O onto an adsorbent to create a pretreated, diluted, rare-gas-containing, nitrogen-based exhaust stream; and
withdrawing the pretreated, diluted, rare-gas-containing, nitrogen-based exhaust stream from an outlet of the adsorber of the pretreatment system, said pretreated, diluted, rare-gas-containing, nitrogen-based exhaust stream having a composition comprising the rare gas, the gaseous impurities and the N2, said rare gas in an amount greater than 0 mol % and less than about 0.05 mol %, and said gaseous impurities remaining after the step of pretreating comprising oxygen (O2) in an amount greater than 0.01 mol % and up to about 2 mol %, CF4 in an amount greater than 0 mol % and up to about 0.01 mol %, CO2 in an amount ranging from 0.00001 mol % and up to about 0.0005 mol %.

33. A method of pretreating a rare-gas containing, nitrogen-based exhaust stream from an etch chamber, comprising:
introducing a rare-gas-containing, nitrogen-based exhaust stream from the etch chamber into a pretreatment system; and
pretreating the rare-gas-containing, nitrogen-based exhaust stream by (x) combusting a substantial portion of combustible gaseous impurities into combustion products comprising carbon dioxide (CO2) and water vapor (H2O) to create a diluted, rare-gas-containing, nitrogen-based exhaust stream; (y) removing a substantial portion of corrosive fluorides; and (z) adsorbing substantially all of the CO2 and the H2O onto an adsorbent of to create a pretreated, diluted, rare-gas-containing, nitrogen-based exhaust stream.

34. The method of claim 33, further comprising:
directing the pretreated, diluted, rare-gas-containing, nitrogen-based exhaust stream into a rare gas recovery unit; and
separating the rare-gas from the pretreated, diluted, rare-gas-containing, nitrogen-based exhaust stream in the rare gas recovery unit as a product stream.

35. The method of claim 33, further comprising collecting multiple rare-gas-containing, nitrogen-based exhaust streams into a collection manifold, while excluding one or more non-rare-gas-containing, nitrogen-based exhaust streams from entering into the collection manifold.

36. The method of claim 34, wherein the composition of the product stream comprises the rare gas in an amount of greater than about 10 mol %, carbon dioxide in an amount that is up to 0.5 mol %, oxygen in an amount that is less than about 2 mol %, carbon tetrafluoride in an amount that is less than about 1 mol % and nitrogen.

37. The method of claim 34, wherein (i) the rare gas recovery unit is a temperature swing adsorber (TSA) when the rare gas comprises xenon and (ii) the rare gas recovery unit is a cryo-distillation column when the rare gas comprises krypton.

\* \* \* \* \*